United States Patent
Campbell

(10) Patent No.: US 10,239,466 B2
(45) Date of Patent: Mar. 26, 2019

(54) AVIONICS DISPLAY FASTENER ASSEMBLY

(71) Applicant: GE AVIATION SYSTEMS LLC, Grand Rapids, MI (US)

(72) Inventor: Mark Woodworth Campbell, Tampa, FL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/611,120

(22) Filed: Jun. 1, 2017

(65) Prior Publication Data

US 2018/0345873 A1    Dec. 6, 2018

(51) Int. Cl.
| | |
|---|---|
| *H04N 5/64* | (2006.01) |
| *B60R 11/02* | (2006.01) |
| *B64D 43/00* | (2006.01) |
| *F16B 21/04* | (2006.01) |
| *F16B 39/24* | (2006.01) |
| *G02F 1/1333* | (2006.01) |
| *B60R 11/00* | (2006.01) |

(52) U.S. Cl.
CPC .......... *B60R 11/0229* (2013.01); *B64D 43/00* (2013.01); *F16B 21/04* (2013.01); *F16B 39/24* (2013.01); *G02F 1/133308* (2013.01); *B60K 2350/941* (2013.01); *B60R 11/02* (2013.01); *B60R 2011/0005* (2013.01); *B60R 2011/0007* (2013.01); *B60R 2011/0052* (2013.01); *G02F 2001/133325* (2013.01)

(58) Field of Classification Search
CPC ...................... B60R 11/0229; B60K 2350/941
USPC ........................................................ 348/837
See application file for complete search history.

(56) References Cited

U.S. PATENT DOCUMENTS

| | | |
|---|---|---|
| 6,343,863 B1 | 2/2002 | Wood |
| 6,592,387 B2 | 7/2003 | Komenda et al. |
| 7,417,866 B1 | 8/2008 | Beseth et al. |
| 8,477,504 B2 | 6/2013 | Bopp |
| 8,701,953 B2 | 4/2014 | Bopp et al. |
| 9,317,146 B1 | 4/2016 | Hufnagel |
| 2006/0024148 A1* | 2/2006 | Wei ................ F16B 19/109 411/348 |
| 2007/0266514 A1 | 11/2007 | Umbrell |
| 2016/0264061 A1 | 9/2016 | Mozer et al. |
| 2017/0136936 A1* | 5/2017 | Lamoureux ........... B60P 7/0815 |
| 2017/0336632 A1* | 11/2017 | Ushida .................. B60K 35/00 |

FOREIGN PATENT DOCUMENTS

| | | |
|---|---|---|
| JP | 52115191 U | 9/1977 |
| JP | 5849009 U | 4/1983 |
| WO | 2010039279 A1 | 4/2010 |

OTHER PUBLICATIONS

Extended European Search Report and Opinion issued in connection with corresponding EP Application No. 18175562.0 dated Oct. 25, 2018.

* cited by examiner

*Primary Examiner* — Richard T Torrente
(74) *Attorney, Agent, or Firm* — GE Aviation Systems LLC; William Andes

(57) ABSTRACT

A fastener assembly for aircraft cockpit electronics can include a spring locking quarter turn fastener, where a head of the fastener can be positioned on a non-display side of the assembly, and a thread of the fastener can extend to a display side of the assembly. The fastener assembly can additionally include a spring assembly and mounting hardware.

18 Claims, 7 Drawing Sheets

AVIONICS DISPLAY FASTENER ASSEMBLY

BACKGROUND OF THE INVENTION

Contemporary aircraft can include electronic devices including displays for displaying graphical, textual, or decimal information to a user, pilot, or co-pilot. Such information can be provided or presented to a user to inform the user of the status of the aircraft or a system thereof.

Displays can be mounted within the aircraft. As aircraft displays utilize increased space for functions such as touch-sensitive screens or larger readout sizes, strategic use of fastener size and placement can be beneficial to optimize displayed information.

BRIEF DESCRIPTION OF THE INVENTION

In one aspect, a fastener assembly for cockpit electronics includes a quarter turn spring locking fastener having a head on a non-display side of the assembly and a thread extending to a display side of the assembly, a spring assembly including at least two leaf springs in a stacked configuration moveably coupled about at least a portion of the thread, and mounting hardware configured to secure the spring assembly to the thread.

In another aspect, an avionics display assembly includes a frame assembly including a mounting flange, a touch screen display operably coupled to the frame assembly, at least one fastener assembly including a quarter turn spring locking fastener having a head on a non-display side of the assembly and a thread extending to a display side of the assembly, a spring assembly including at least two leaf springs in a stacked configuration moveably coupled about at least a portion of the thread, and mounting hardware configured to secure the spring assembly to the thread.

In yet another aspect, an avionics display assembly includes a frame assembly including a mounting flange having at least one opening and defining a display side and a non-display side, a display screen operably coupled to the frame assembly, a set of fastener assemblies including a quarter turn spring locking fastener having a head located on the non-display side and a threaded portion extending through the at least one opening to the display side, a spring assembly including at least two leaf springs in a stacked configuration moveably coupled about at least a portion of the thread on the display side, a bushing located between the mounting flange and the spring assembly, and mounting hardware configured to secure the spring assembly to the thread.

DESCRIPTION OF EMBODIMENTS OF THE INVENTION

Figure 1:
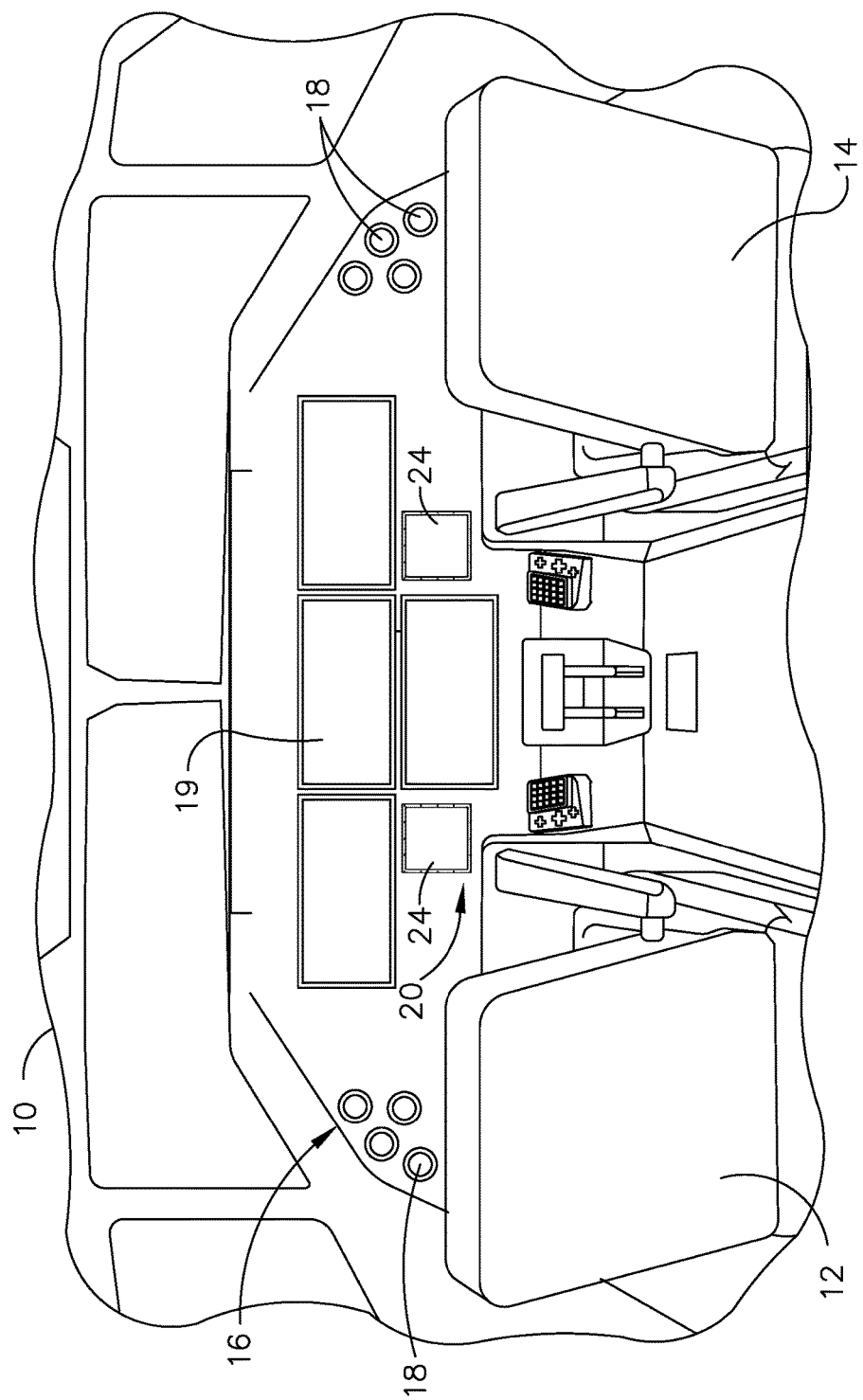
FIG. 1 is a perspective view of a portion of a cockpit including a display assembly.

The described embodiments of the present disclosure are directed to a fastener assembly. For purposes of illustration, the present disclosure will be described with respect to an aircraft cockpit electronics fastener assembly. It will be understood that the disclosure is not so limited and that the fastener assembly can be used anywhere within the aircraft, or in other electronics applications, or in other mobile or non-mobile applications as desired.

While "a set of" various elements will be described, it will be understood that "a set" can include any number of the respective elements, including only one element. As used herein, the terms "axial" or "axially" refer to a dimension along a longitudinal axis of an electric machine or along a longitudinal axis of a component disposed within the engine. As used herein, the terms "radial" or "radially" refer to a dimension extending between a center longitudinal axis of the engine, an outer rotational circumference, or a circular or annular component disposed within the engine. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates a non-limiting example of a portion of an aircraft cockpit 10. While a commercial aircraft has been illustrated, it is contemplated that aspects of the disclosure can be used in any type of legacy aircraft, for example, without limitation, fixed-wing, rotating-wing, rocket, personal aircraft, and military aircraft. A first user (e.g., a pilot) can be present in a seat 12 at the left side of the cockpit 10 and another user (e.g., a co-pilot) can be present at the right side of the cockpit 10 in a seat 14. A flight deck 16 can include various instruments 18, various displays 19, and a set of avionics display assemblies 20. In one non-limiting aspect of the disclosure, a display assembly 20 can include a multifunction flight display with a display screen 24 that can be located in front of the pilot or co-pilot and can provide the flight crew with information to aid in flying the aircraft.

The display screen 24 can include either primary flight displays or multifunction displays and can display a wide range of aircraft, flight, navigation, and other information used in the operation and control of the aircraft. Non-limiting aspects of the display screen 24 can include displaying color graphics or text to a user, pilot, or co-pilot. The set of display assemblies 20 can be laid out in any manner, and need not be coplanar or the same size.

A touch screen display or touch screen surface can be included in the display screens 24 and can be used by one or more flight crewmembers, including the pilot and co-pilot, to interact with the systems of the aircraft.

Figure 2:
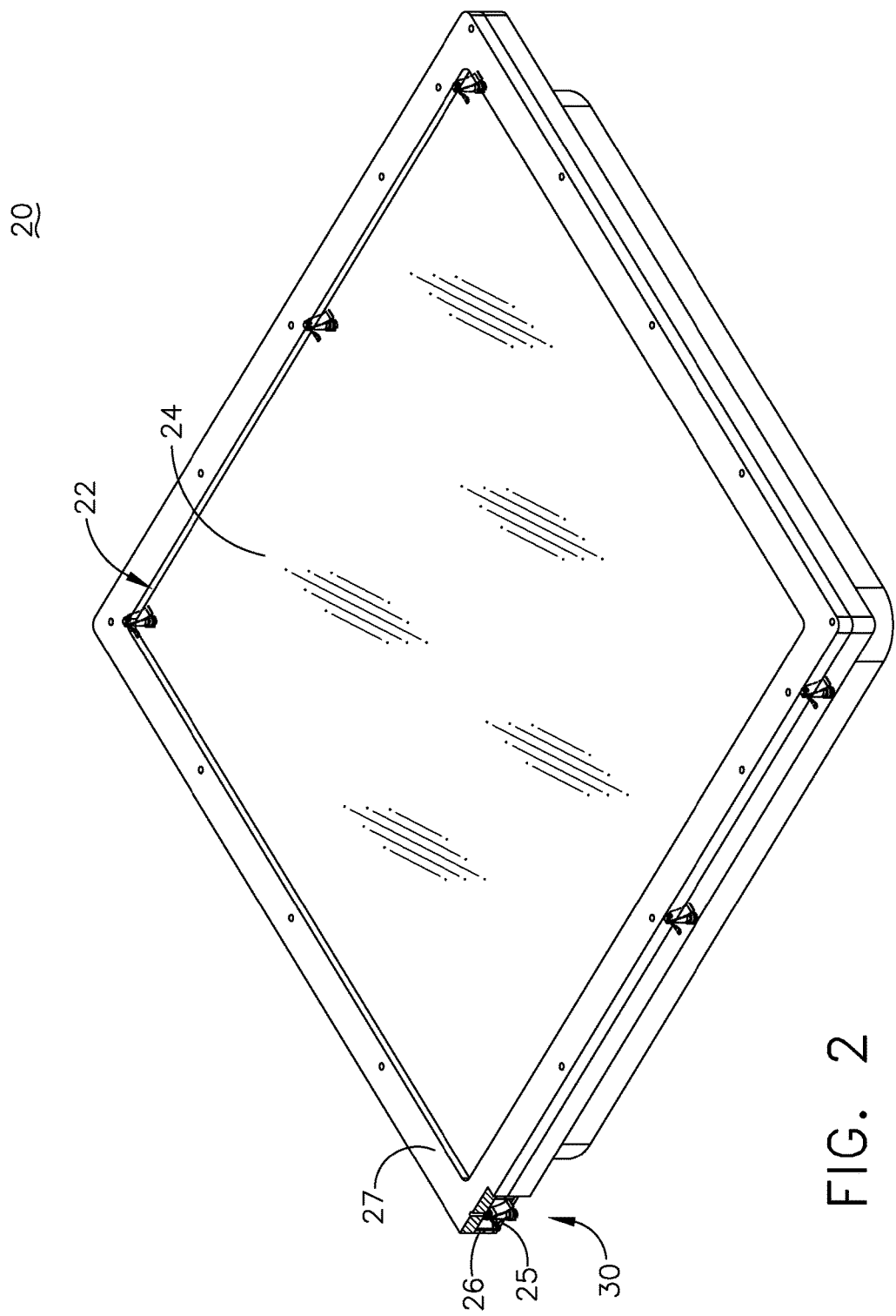
FIG. 2 is a perspective view of the display assembly of FIG. 1 including a fastener assembly within a partially cutaway frame assembly.

FIG. 2 illustrates that the touch screen surface of the display screen 24 can be located within a frame assembly 22. A lower housing 26 and upper housing 27 can be included in the frame assembly 22. A mounting flange 25 can be provided or integrally formed within the lower housing 26. A fastener assembly 30 can be provided to secure the frame assembly 22 to a portion of the aircraft cockpit 10. While a single fastener assembly 30 is illustrated in detail, it will be appreciated that a set of fastener assemblies 30 can be included in the avionics display assembly 20. As such a set of phantom schematic fastener assemblies 30 have been illustrated at various locations about the frame assembly 22. More specifically, fastener assemblies 30 have been included at the corners and several of the midpoints of edges of the frame assembly 22. It will be understood that any suitable number of fastener assemblies can be included at any suitable locations.

Figure 3:
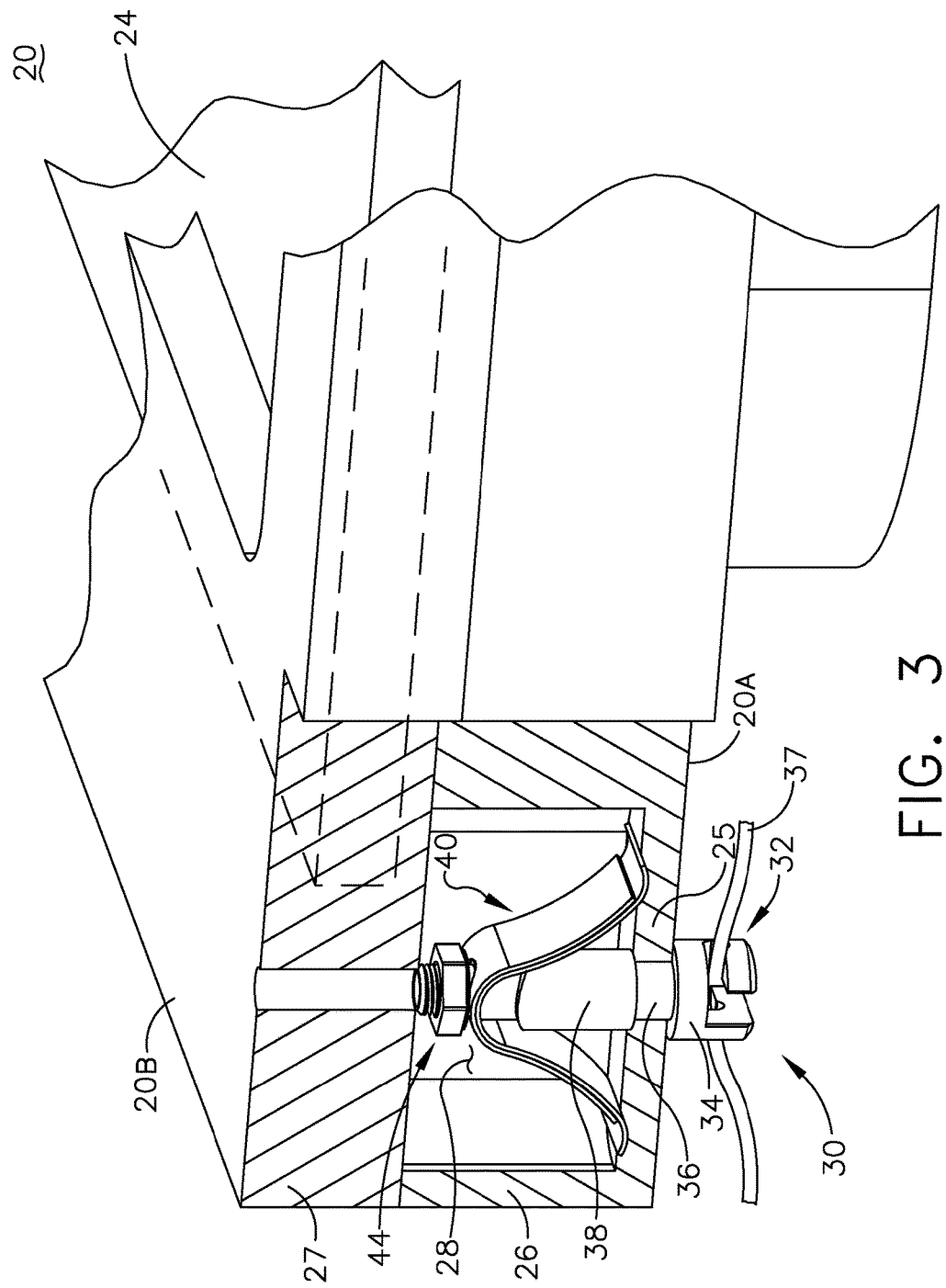
FIG. 3 is a perspective view of the fastener assembly of FIG. 2 within a partially cutaway frame assembly.

A cavity 28 can be defined within the lower housing 27, and the fastener assembly 30 can be housed within the cavity 28 as shown in FIG. 3. A spring locking quarter turn fastener 32 having a head 34 and a thread 36 can be included in the fastener assembly 30, where the head 34 can be positioned on a non-display side 20A of the display assembly 20, and the thread 36 can extend to a display side 20B of the display assembly 20 as shown. A standard 4-40UNC thread is contemplated for the thread 36, and it will be understood that any suitable thread may be used.

The spring locking quarter turn fastener 32 can form a rail engagement fastener configured to mount to a cockpit rail by way of a fastener spring 37, a portion of which is illustrated in FIG. 3. The quarter turn fastener 32 is illustrated herein as a quarter turn line fastener that can move downward to engage the fastener spring 37, where a quarter-turn rotation of the head 34 can lock the fastener spring 37 into place and secure the frame assembly 22 in the cockpit 10. It will be understood that other types or styles of fasteners are contemplated for use in the fastener assembly 30.

A spring assembly 40, movably coupled about at least a portion of the thread 36, can also be included in the fastener assembly 30. The spring assembly 40 can include a set of stacked leaf springs, illustrated as a first leaf spring 41 and second leaf spring 42. By way of non-limiting example, the first leaf spring 41' and second leaf spring 42 can be made of 301 stainless steel. The leaf springs 41 and 42 can be sized to exert the same or differing amounts of spring force under a given amount of compression as desired. It can be appreciated that the spring forces exerted by each leaf spring 41, 42 are combined when the leaf springs 41, 42 are in the stacked arrangement.

A bushing 38 can be included in the fastener assembly 30. The bushing 38 can be located about at least a portion of the thread 36 and can be configured to space the spring assembly 40 from the mounting flange 25. The bushing can be formed from stainless steel in a non-limiting example, and can also be integrally formed with the flange 25 or provided as a separately-attachable piece as shown.

Mounting hardware 44 can be included within the fastener assembly 30 and used to secure the spring assembly 40 to the thread 36. In the illustrated example, the mounting hardware 44 is illustrated, in a non-limiting example, as a stainless steel threaded nut 45 and washer 46. It will be understood that any suitable mounting hardware 44 can be utilized.

Figure 4:
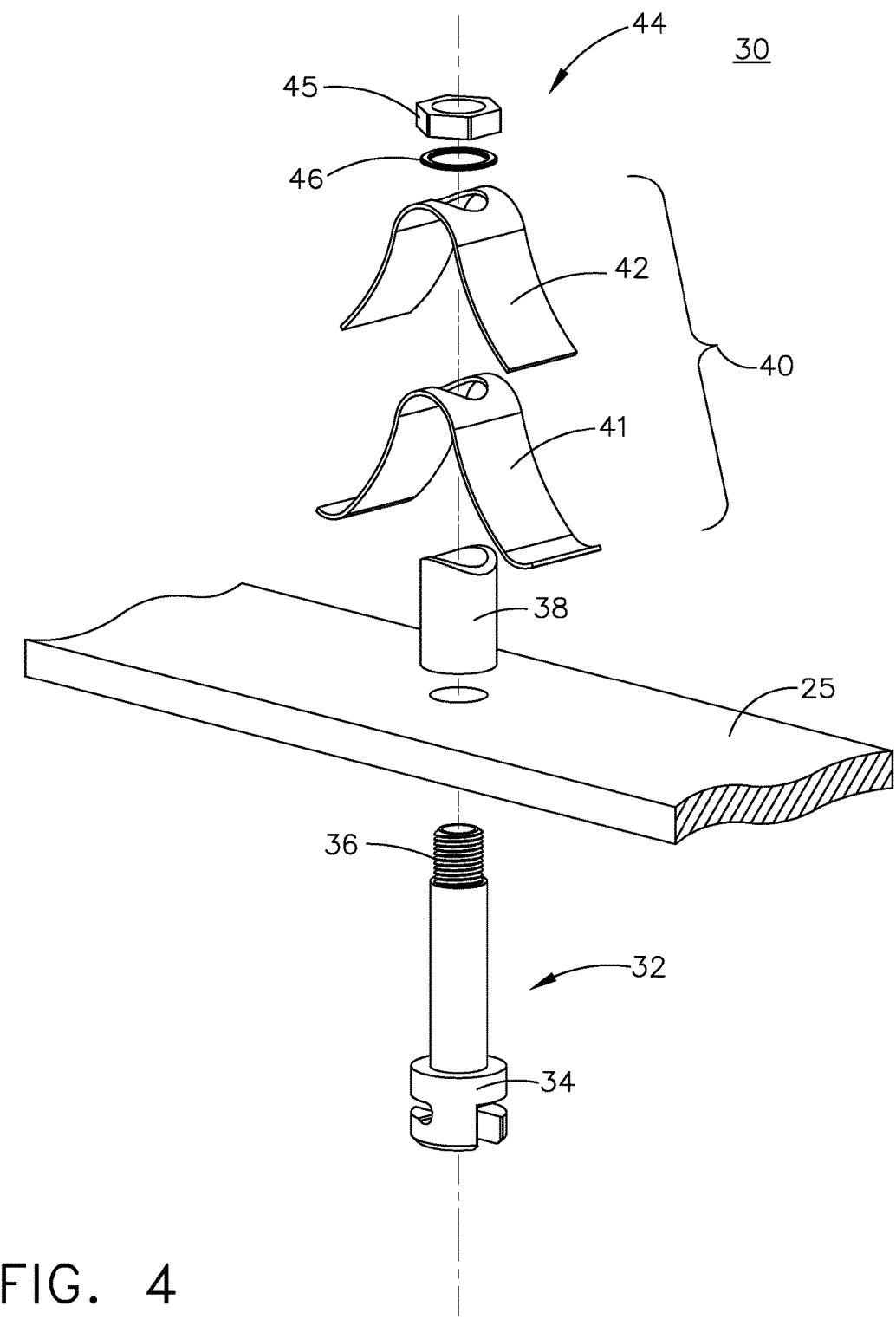
FIG. 4 is an exploded perspective view of the fastener assembly of FIG. 2.

The fastener assembly 30 can be seen in greater detail in the exploded view of FIG. 4. The quarter turn fastener 32 can be positioned below the mounting flange 25 such that the thread 36 can extend through the mounting flange 25 when assembled. The bushing 38 can be positioned above the mounting flange 25. The first leaf spring 41 and second leaf spring 42 can be positioned above the bushing 38 in a stacked configuration as shown. The mounting hardware 44 can be positioned at the distal end of the thread 36 to hold the spring assembly 40 onto the thread 36.

Figure 5:
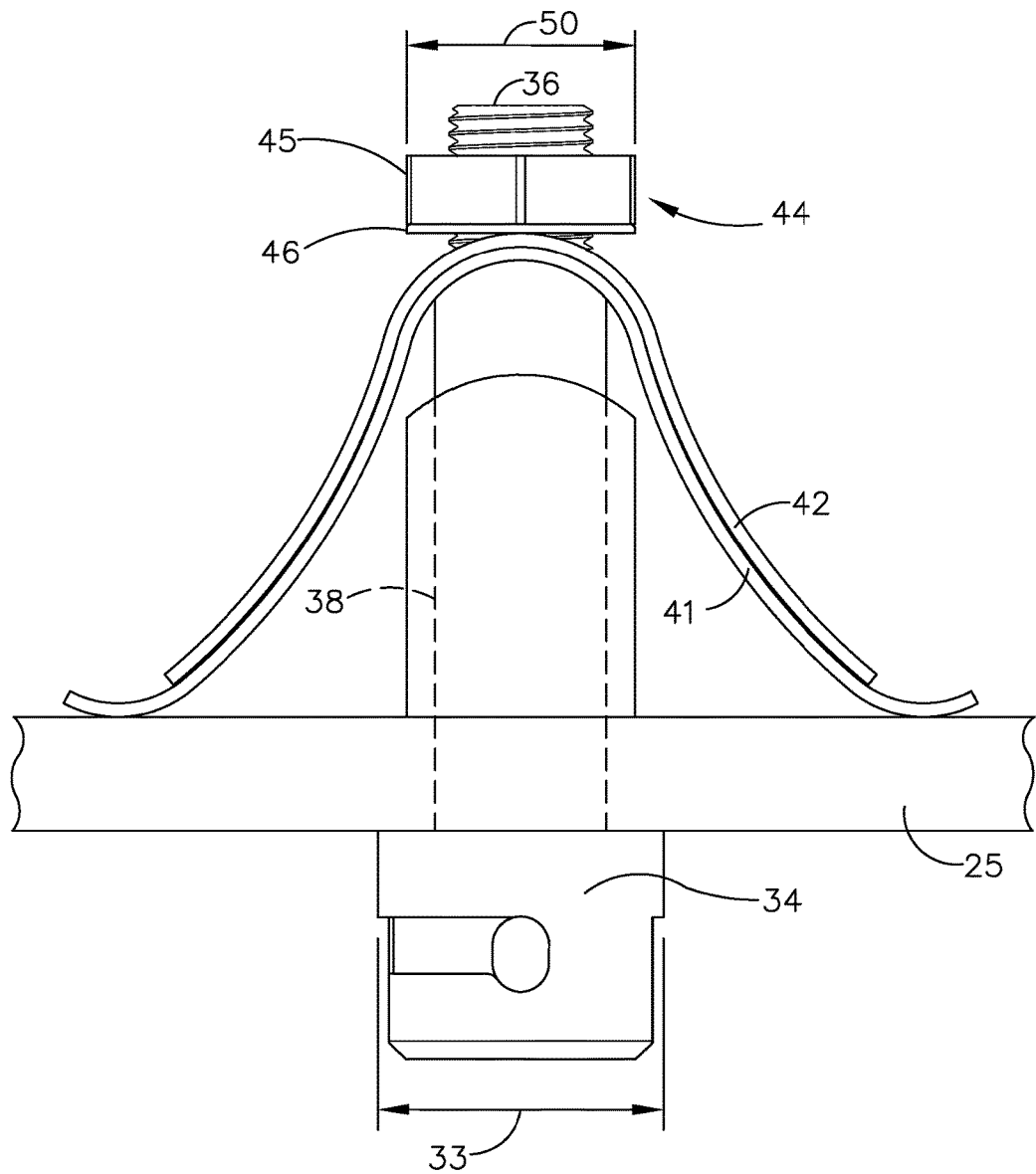
FIG. 5 is a side view of the fastener assembly of FIG. 2 in a first position.

When assembled as shown in FIG. 5, the bushing 38, first leaf spring 41, and second leaf spring 42 can be slidably received on the thread 36, and the mounting hardware 44 (such as the threaded nut) can be tightened about the thread 36 to secure the components to form the assembled fastener assembly 30. The spring assembly 40 is illustrated in a first position, where the leaf springs 41, 42 are at rest and the quarter-turn fastener 32 is positioned abutting the mounting flange 25.

Figure 6:
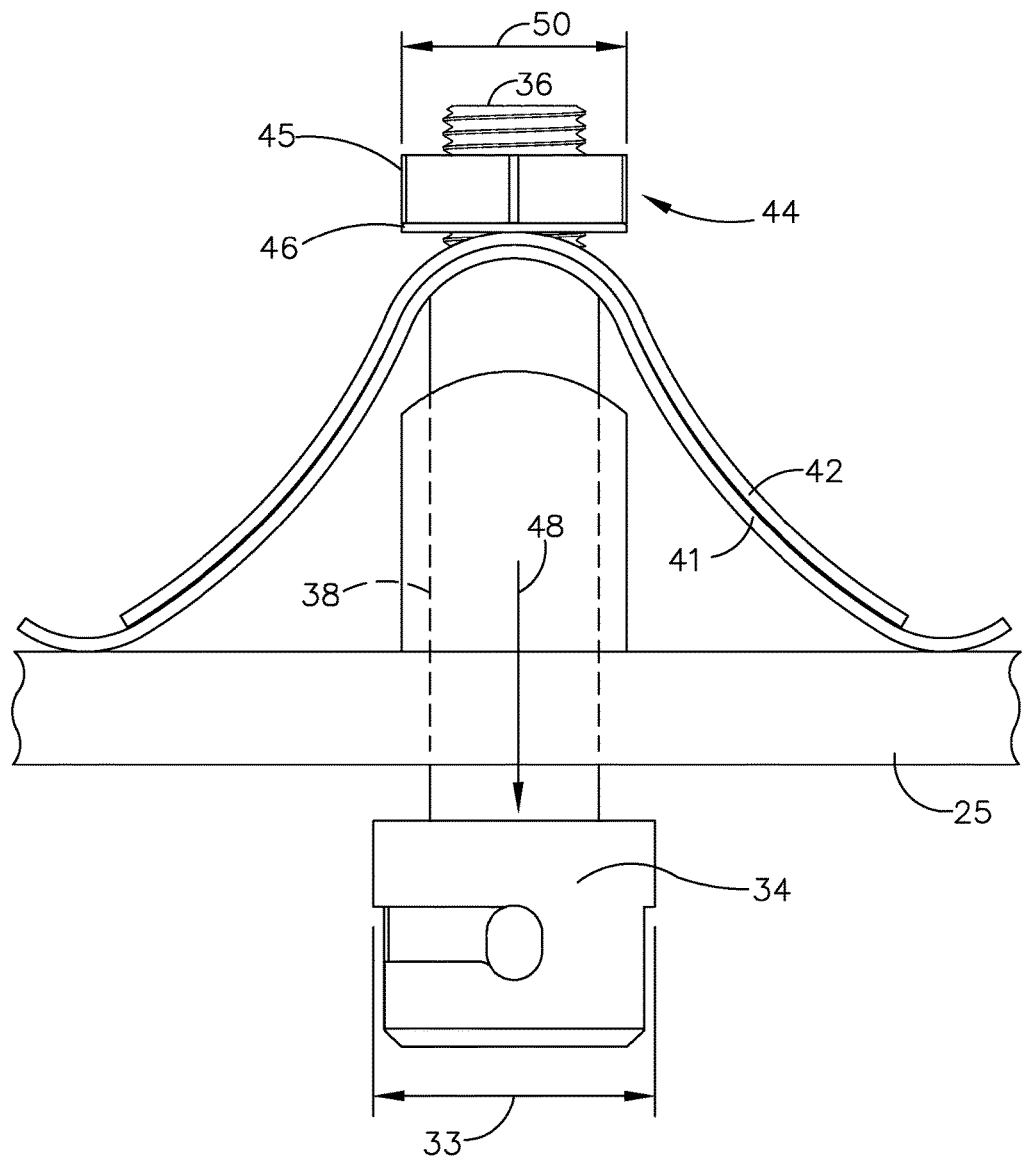
FIG. 6 is a side view of the fastener assembly of FIG. 2 in a second position.

The spring assembly 40 can compress in a vertical direction when assembled and tightened by the mounting hardware 44, and FIG. 6 illustrates the spring assembly 40 in a second, flexed or compressed position. When the spring assembly 40 has been compressed, the quarter turn fastener 32 is displaced in a vertical direction shown by an arrow 48 during compression of the spring assembly 40 and become spaced apart from the mounting flange 25. In a non-limiting example the spring assembly 40 can be configured to allow the quarter turn fastener 32 to be displaced vertically by 0.16 cm compared with a non-flexed position of the spring assembly 40. It can be appreciated that the vertical displacement of the quarter turn fastener 32 can provide for engagement with the fastener spring 37 (FIG. 3) to mount the frame assembly 22 to the cockpit 10 (FIG. 1). The spring assembly 40 can also provide a retention force sufficient to ensure the proper retention force required by aircraft manufactures to secure cockpit electronics, and in one non-limiting example the spring assembly 40 can be configured to provide a retention force of at least 65 N when assembled and secured with the mounting hardware 44.

The quarter turn fastener 32 can have a fastener width 33 and the mounting hardware 44 can have a hardware width 50 as shown. It should be understood that the fastener width 33 and hardware width 50 can describe the diameter or the largest dimension of the quarter turn fastener 32 and mounting hardware 44, respectively. It is contemplated that the fastener width 33 can be 0.75 cm or smaller, and a 0.635 cm (quarter-inch) nut is contemplated for use with the mounting hardware 44.

Figure 7:
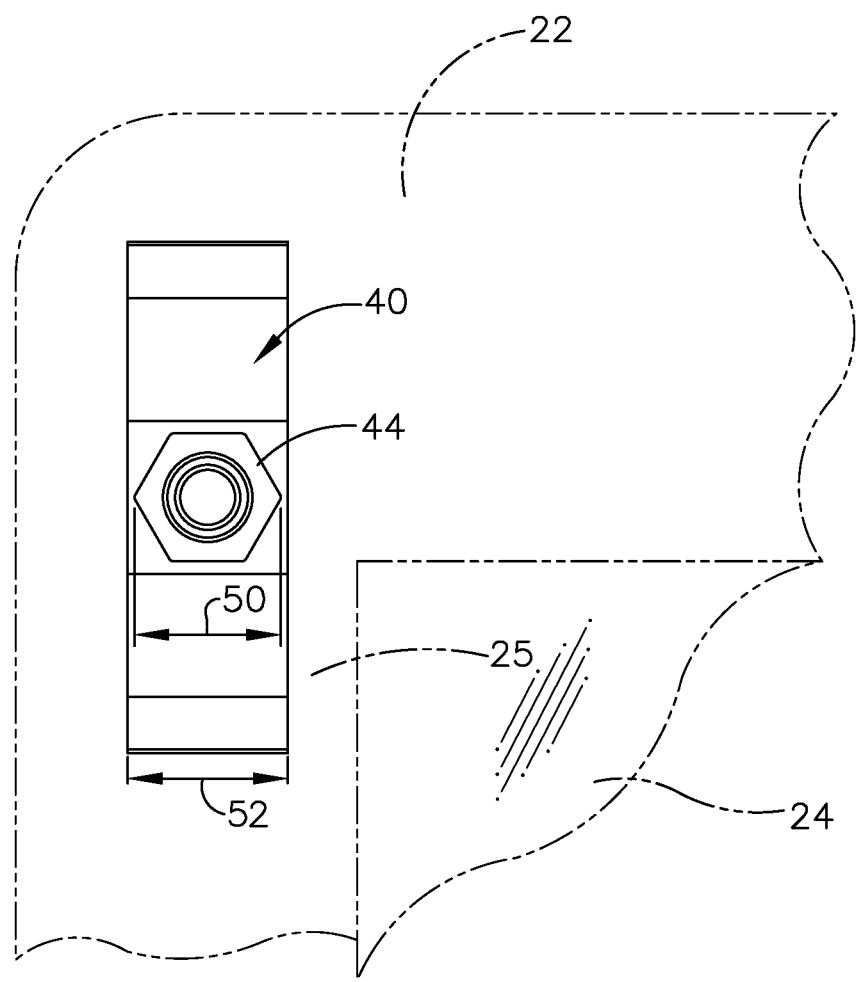
FIG. 7 is a top view of the fastener assembly of FIG. 2 positioned within the display assembly of FIG. 2.

Turning to FIG. 7, the fastener assembly 30 is illustrated while mounted to a portion of the frame assembly 22. It is contemplated that an overall width 52 of the fastener assembly 30 can be the same size as the fastener width 33, such as 0.75 cm or smaller in a non-limiting example. The hardware width 50, such as that of the quarter-inch (0.635 cm) nut, can be smaller than the overall width 52 of the fastener assembly 30. In one non-limiting example the overall width 52 can be the same size as a width of the leaf springs 41, 42 as well as a width of the bushing 38. In another non-limiting example a width of the bushing 38 can be the same size or smaller than the overall width 52 such that the bushing 38 can fit fully within the leaf springs 41, 42.

Quarter turn fasteners traditionally contain internal coil springs, where the force exerted by the coil springs is used to secure an electronics display to a mounting piece. Traditionally-used quarter turn fasteners include coil springs within their interior. A coil spring of sufficient strength, to securely mount the electronics display, generally has a standard diameter of 0.34 inches (0.87 cm).

It can be appreciated that aspects of the avionics display assembly described in the present disclosure can provide for a variety of benefits. One benefit is at least a 25% reduction in width of the fastener assembly 30, which can increase the available space for touch screen displays. It can be further appreciated that in limited-space applications such as airplane cockpits, increasing the size or usable area of display or touch screens can improve the quality or delivery of information as well as optimize touch-screen applications such as keyboards. An additional benefit can be found in the use of the stacked leaf springs which can provide for an increase in available spring force, compared with springs found in traditional quarter turn fasteners, without increasing the overall width of the fastener assembly. While other traditional mounting systems such as cams or levers can be used to mount display screens, the complexity involved in arranging such systems within aircraft cockpits can increase cost or failure rates. It can be appreciated that the fastener assembly 30 as described herein can be used in current existing aircraft cockpit electronics and also utilize pre-existing aircraft rails or wires to mount the display assembly 20 to the cockpit 10.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fastener assembly for cockpit electronics, comprising:
   a spring locking quarter turn fastener having a head on a non-display side of the assembly and a thread extending to a display side of the assembly, the spring locking quarter turn fastener is a quarter turn line fastener configured to mount to a cockpit rail;
   a spring assembly including at least two leaf springs in a stacked configuration moveably coupled about at least a portion of the thread;
   mounting hardware configured to secure the spring assembly to the thread; and
   a bushing located about at least a portion of the spring locking quarter turn fastener and configured to space the spring assembly from a mounting flange of the cockpit electronics;
   wherein flexion of the spring assembly is configured to allow a vertical displacement of the spring locking quarter turn fastener.

2. The fastener assembly of claim 1 wherein the spring assembly is configured to provide a retention force of at least 65 N.

3. The fastener assembly of claim 2 wherein the quarter turn fastener has a diameter of 0.75 cm.

4. The fastener assembly of claim 1 wherein the vertical displacement of the quarter turn fastener is 0.16 cm.

5. The fastener assembly of claim 1 wherein the mounting hardware includes a 0.635 cm nut.

6. The fastener assembly of claim 1 wherein the bushing is located about at least a portion of the thread.

7. The fastener assembly of claim 1 wherein the quarter turn fastener has a width less than or equal to 0.75 cm.

8. An avionics display assembly, comprising:
   a frame assembly including a mounting flange;
   a touch screen display operably coupled to the frame assembly; and
   at least one fastener assembly, comprising:
      a spring locking quarter turn fastener in the form of a quarter turn line fastener configured to mount to a cockpit rail, the spring locking quarter turn fastener having a head on a non-display side of the assembly and a thread extending to a display side of the assembly;
      a spring assembly including at least two leaf springs in a stacked configuration moveably coupled about at least a portion of the thread;
      mounting hardware configured to secure the spring assembly to the thread; and
      a bushing located about at least a portion of the spring locking quarter turn fastener and configured to space the spring assembly from a mounting flange of the cockpit electronics;
      wherein flexion of the spring assembly is configured to allow a vertical displacement of the spring locking quarter turn fastener.

9. The avionics display assembly of claim 8 wherein the spring assembly is configured to provide a retention force of at least 65 N.

10. The avionics display assembly of claim 8 wherein the quarter turn line fastener has a diameter equal to or less than 0.75 cm.

11. The avionics display assembly of claim 8 the bushing is located about at least a portion of the thread.

12. The avionics display assembly of claim 8 wherein the quarter turn fastener has a width less than or equal to 0.75 cm.

13. The avionics display assembly of claim 8 wherein the frame assembly comprises an upper housing and a lower housing.

14. The avionics display assembly of claim 13 wherein the lower housing includes a cavity and the spring assembly is housed within the cavity.

15. The avionics display assembly of claim 8 wherein at least one fastener assembly includes multiple fastener assemblies located at least at corners of the mounting flange.

16. An avionics display assembly, comprising:
   a frame assembly including a mounting flange having at least one opening and defining a display side and a non-display side;
   a display screen operably coupled to the frame assembly; and
   a set of fastener assemblies, comprising:

a spring locking quarter turn fastener in the form of a quarter turn line fastener configured to mount to a cockpit rail, the spring locking quarter turn fastener having a head located on the non-display side and a threaded portion extending through the at least one opening to the display side;

a spring assembly including at least two leaf springs in a stacked configuration moveably coupled about at least a portion of the thread on the display side;

a bushing located about at least a portion of the spring locking quarter turn fastener between the mounting flange and the spring assembly; and mounting hardware configured to secure the spring assembly to the thread;

wherein flexion of the spring assembly is configured to allow a vertical displacement of the spring locking quarter turn fastener.

17. The avionics display assembly of claim 16 wherein the quarter turn fastener has a width less than or equal to 0.75 cm and the spring assembly is configured to provide a retention force of at least 65 N.

18. The avionics display assembly of claim 16 wherein the display screen is a touchscreen.

\* \* \* \* \*

UNITED STATES PATENT AND TRADEMARK OFFICE
CERTIFICATE OF CORRECTION

| | |
|---|---|
| PATENT NO. | : 10,239,466 B2 |
| APPLICATION NO. | : 15/611120 |
| DATED | : March 26, 2019 |
| INVENTOR(S) | : Mark Campbell et al. |

Page 1 of 1

It is certified that error appears in the above-identified patent and that said Letters Patent is hereby corrected as shown below:

On the Title Page

Item (12) delete:
"Campbell"

And insert:
-- Campbell et al. --

Item (72) Inventor:
Mark Woodworth Campbell, Tampa, FL (US)

Should be:
Mark Woodworth Campbell, Tampa, FL (US)
David Carrillo, Lutz, FL (US)

Signed and Sealed this
Twenty-fifth Day of March, 2025

Coke Morgan Stewart
*Acting Director of the United States Patent and Trademark Office*